United States Patent [19]
von Blücher et al.

[11] Patent Number: 5,350,443
[45] Date of Patent: Sep. 27, 1994

[54] FILTER SHEET MATERIAL FOR PASSENGER CABINS IN MOTOR VEHICLES

[76] Inventors: Hasso von Blücher, Parkstrasse 10, D-4006 Erkrath; Ernest de Ruiter, Höhenstrasse 57a, D-5090 Leverkusen 3, both of Fed. Rep. of Germany

[21] Appl. No.: 47,473

[22] Filed: Apr. 19, 1993

[51] Int. Cl.$^5$ .................. B01D 53/04; B01D 29/01
[52] U.S. Cl. ................................ 96/135; 96/142; 96/154; 55/524; 55/527; 55/DIG. 39
[58] Field of Search .............. 96/134, 135, 142, 147, 96/153, 154; 55/DIG. 39, 524, 527, 528, DIG. 5

[56] References Cited

U.S. PATENT DOCUMENTS

| | | | |
|---|---|---|---|
| 2,984,584 | 5/1961 | Glarum et al. | 96/153 X |
| 3,449,094 | 6/1969 | Baxt et al. | 96/153 X |
| 3,727,597 | 4/1973 | Hensler | 96/142 X |
| 3,978,185 | 8/1976 | Buntin et al. | 264/93 |
| 4,130,487 | 12/1978 | Hunter et al. | 96/154 X |
| 4,181,513 | 1/1980 | Fukuda et al. | 96/153 |
| 4,217,386 | 8/1980 | Arons et al. | 96/154 X |
| 4,234,326 | 11/1980 | Bailey et al. | 96/154 |
| 4,250,172 | 2/1981 | Mutzenberg et al. | 96/154 X |
| 4,289,513 | 9/1981 | Brownhill et al. | 96/135 |
| 4,342,811 | 8/1982 | Lopatin et al. | 96/153 X |
| 4,382,440 | 5/1983 | Kapp et al. | 96/134 X |
| 4,424,248 | 1/1984 | Tesch et al. | 96/154 X |
| 4,427,425 | 1/1984 | Briggs et al. | 96/134 X |
| 4,433,024 | 2/1984 | Eian | 96/153 X |
| 4,484,938 | 11/1984 | Okamoto et al. | 96/154 X |
| 4,510,193 | 4/1985 | Blücher et al. | 96/154 X |
| 4,517,308 | 5/1985 | Ehlenz et al. | 96/153 X |
| 4,610,705 | 9/1986 | Sarnosky et al. | 96/135 |
| 4,699,681 | 10/1987 | Kasmark, Jr. et al. | 96/154 X |
| 4,737,173 | 4/1988 | Kudirka et al. | 96/153 X |
| 4,938,786 | 7/1990 | Tonomoto | 96/134 X |
| 4,957,897 | 9/1990 | Maroldo et al. | 502/432 |
| 4,981,501 | 1/1991 | von Blücher et al. | 96/153 |
| 4,992,084 | 2/1991 | von Blücher et al. | 96/153 X |
| 5,139,546 | 8/1992 | Novobilski | 96/142 |
| 5,141,706 | 8/1992 | Clark | 96/142 X |
| 5,192,346 | 3/1993 | Kowalczyk | 96/135 |
| 5,221,292 | 6/1993 | Aoyama | 96/142 X |
| 5,221,573 | 6/1993 | Baigas, Jr. | 55/DIG. 39 |

FOREIGN PATENT DOCUMENTS

| | | |
|---|---|---|
| 0100907 | 7/1983 | European Pat. Off. . |
| 2503615 | 7/1975 | Fed. Rep. of Germany . |
| 3228156 | 2/1984 | Fed. Rep. of Germany . |
| 3304349 | 8/1984 | Fed. Rep. of Germany . |
| 3740091 | 6/1989 | Fed. Rep. of Germany . |
| 3904623 | 8/1990 | Fed. Rep. of Germany . |

*Primary Examiner*—Robert Spitzer

[57] ABSTRACT

Disclosed is a filter sheet material for passenger cabins in motor vehicles, especially for the removal of unpleasant exhaust fumes, whereby on one and the same air permeable support material, a particle-filtering layer as well as an adsorption filter layer is provided. The adsorptive material in the adsorption filter layer is selected from active carbon particles, activated carbonized carbon particles, molecular sieves, porous polymer adsorbers and carbonized ion-exchangers. The particle filtering layer comprises a micro-fibre agglomeration.

24 Claims, No Drawings

FILTER SHEET MATERIAL FOR PASSENGER CABINS IN MOTOR VEHICLES

BACKGROUND OF THE INVENTION

The invention relates to a filter sheet material in motor vehicles, especially a filter material for the removal of unpleasant odours in the passenger cabin of motor vehicles. Due to the continuously rising traffic volume passengers of motor vehicles are exposed to a high degree of unpleasant odours of exhaust fumes. German Offenlegungsschrift 37 40 091 discloses a pourable filter sheet material comprising a catalyst. German patent 25 03 615 discloses a multi-layered filter sheet material consisting of a support layer, at least one intermediate layer of polymer micro-fibres and a porous cover layer.

German patent 33 04 349 as well as U.S. Pat. No. 4,510,193 disclose a filter sheet material consisting of an air-permeable, pliable, especially textile support which is covered only partially with a uniformly distributed adhesive on which adsorber particles, especially active carbon beads are fixed. Said prior art furthermore concerns the use of such filter materials containing active carbon as adsorbant for protective suits.

The German Offenlegungsschrift 32 28 156 as well as the European Patent 100 907 having the same priority disclose that the removal of unpleasant odours is achieved by active carbon as an adsorbant of choice. However, said adsorber particles may be only partially covered by an adhesive, because otherwise, the pores are not sufficiently accessible and therefore the desired effect will not be achieved. Furthermore, it is advisable that the adsorber particles will be protected against a blocking of the pores by dust and soot particles, whereby the use of a pre-filter sheet material is necessary.

The German Offenlegungsschrift 39 04 623 discloses an odour filter sheet material, wherein a particle filter sheet material and an adsorption filter sheet material are provided directly side by side which two components of the filtering means are both folded zigzag. In this prior art device, the air first passes the particle filter sheet material and then the adsorption sheet material. This prior art device has the disadvantage that the individual layers of the filter sheet material must be manufactured separately and that the further processing to obtain the filter sheet material is not easily achieved, due to the multi-layer structure.

DESCRIPTION OF THE INVENTION

It is the object of the invention to provide a more simple construction for a filter sheet material for passenger cabins in motor vehicles, especially suitable for the removal of unpleasant odours. Further objects of the present invention are apparent for one skilled in the art when reading this specification.

There has been quite unexpectedly found that the above mentioned problem is solved by providing a filter sheet material, wherein a support material is used on which the particle filter layer as well as the adsorption filter layer is provided, i.e. micro-fibres as well as adsorbing means are fixed thereon.

Thus, the present invention relates to a filtering sheet material for the removal of unpleasant odours from the passenger cabin of motor vehicles, especially caused by exhaust fumes, characterized in that on one and the same air-permeable support material a particle filter layer as well as an adsorption filter layer has been provided.

Generally, such a support material consists of a very air-permeable, thermally shapable material, on which one side micro-fibres could be fixed and on which other side, adsorber particles are fixed. Said support is preferably a thermal shapable very air-permeable fleece, a woven or knitted fabric or a lattice work of a thermal shapable plastic. The micro-fibres could on the other hand also be fixed between or on the adsorber particles provided that a sufficient adhesion is achieved. Preferably, the adsorber particles in the adsorption filter layer are fixed at the support material by means of a discontinuously applied adhesive. According to a preferred embodiment of the present invention, the particle filter layer can comprise an electret-filter sheet material which comprises micro-fibres of polysulfone, fluorocarbons, polyvinylchloride, polycarbonate, polyester, polyethylene and/or polypropylene, especially micro-fibres comprising polycarbonate and/or polypropylene. As well known in the art, electret filter materials consist of fibres having an installed chargo, namely a dipole and its action is somewhat similar to conventional electro-filtering devices. The fibres have diameters of about 5 $\mu$m to about 30 $\mu$m, i.e. they are somewhat larger than the fibres discussed lateron. Such types of filter sheet materials are e.g. explained in Staub-Reinhaltung der Luft, Volume 49 (1989) pages 131 to 138, 309 to 314, 365 to 370 and 407 to 411.

The melt-blown-process provides very fine fibres of meltable plastics, i.e. for instance polypropylene. The diameter distribution of the fibres is very narrow, e.g. in the range of about 0.3 to about 0.6 $\mu$m and an average of about 0.5 $\mu$m. This processing requires a certain roughness of the support material so that the micro-fibres can adhere. A review is presented in Reinraumtechnik, 1990, Heft 5 (Mai), pages 22 to 26. Moreover, a melt-blown-process is e.g. described in U.S. Pat. No. 3,978,185 the disclosure of which is incorporated herein by reference.

A further preferred embodiment of the present invention are micro-glass-fibres which are also very small having a lower fibre-distribution-diameter of about 0.2 $\mu$m. They are frequently used as sheet paper materials. A further preferred embodiment of the present invention is to fix the particle filter-layer using a spray adhesive. Such spray adhesives were applied by spraying. They were used in such cases when a high porosity should be maintained. There are some which are permanently tacky, e.g. made of acrylates manufactured by Röhm GmbH, Darmstadt, or those hardening types e.g. made of polyurethane manufactured by Bayer AG. The spray adhesives were used in minimal amounts, i.e. only some grams per m².

The support material could finally be a "filter paper" comprising plastic fibres preferably made of polyester which separation degree is improved by the micro-fibres. Finally, the support material which was used in the form of lattice work, which are equally useful as a reenforcing means and as a carrier for the adsorber particles, could consist of a thermoplast or of a metal being the principle of a wire-mesh. The last material has the advantage that during the folding process of a folding filter device, no thermal load occurs. The individual bars should have a thickness of about 0.1 to about 2.0 mm, so that they could be coasted right round, otherwise, they could also have the form of flat little belts.

The mesh width should preferably be about 2 to about 3 times the diameter of the particles, it must however be taken into account that this is no real restriction. The webs could have any possible form; round and flat webs of little belt types are only described as examples. The adsorber particles are preferably active carbon having diameters of about 0.3 to about 2.0 mm, however also moisture-resistant or hydrophobic molecular sieves, such as e.g. DAY zeolith, Degussa AG as well as carbonized ion-exchangers porous polymers, mostly on the basis of styrene divinylbenzene copolymers, e.g. Sorbathene of Dow Chemical, are suitable. Active carbons on the basis of pitch (spherical form) having diameters of about 0.1 to about 1.0 mm, preferably about 0.3 to about 0.8 mm, are very suitable but also grain active carbon, especially those having a mean micropore diameter of about 1 nm (10 A) and a good system of meso- and macro-pores are suitable, i.e. having a pore volume of micro-, meso- and macro-pores in an amount of almost 1:1:1. Also suitable are spheres of active carbon which have been prepared by carbonisation and/or activation of ion-exchangers and intermediate products thereof. Generally, they have grain sizes of about 0.3 to about 1 mm. The amount of adsorbant applied ranges from about 100 to about 500 g/m$^2$. The carbonized ion-exchangers can be produced in accordance with U.S. Pat. No. 4,957,897 the disclosure of which is incorporated herein by reference. The adsorber particles are preferably fixed by an adhesive by use of a rotation-print-stencil applied as a discontinued layer having the shape of adhesive dots. Such an application process is i.e. described in the German Offenlegungs-schrift 33 04 349 and in U.S. Pat. No. 4,510,193. Suitable adhesives are first of all known as thickened polymeric dispersions. These polymeric binding compounds known to those skilled in the art are e.g. polyurethanes, polyacrylates and elastomers. These can also be halogenated, especially chlorinated or fluorinated.

A second class of adhesives useful for the purpose of the present invention are systems which comprise prepolymers with blocked isocyanates, which, after heating and splitting off of the blocked oxine, were cured with a polyamine. Free polyurethane systems, such as those marketed under the name "High-solids" (Bayer AG) are suitable for the purpose of the present invention. These systems comprise a masked isocyanate prepolymer which is cross-linked to form a polyurethane by means of a cross-linking agent.

A third class of adhesives are mixtures of thickened polymer dispersions and the above "High-Solids". Finally, as fourth class of adhesives, hot-melt-adhesives on the basis of polyamides, polyesters, ethylene-vinylacetate-copolymers (EVA) are very appropriate. An essential characteristic of these adhesives is a good primary tack. Moreover, the adhesive system should be able to create a kind of pedestal between the adsorber particle and the support, because this will improve the streaming properties of said particles. The adhesive is generally applied by a stencil in the form of a heap having a height of about 0.05 to about 0.5 mm and a diameter of about 0.1 to about 1.0 mm. The present invention is further illustrated by the following working examples.

EXAMPLE 1

A support layer consisting of a rigid polyester fleece of about 100 g (REEMAY) which is used in air-filter sheet materials was dot-printed by means of a 25 mesh stencil with a paste of an adhesive consisting of 1000 parts of a masked isocyanate (Impranil HS62), 62 parts of an aliphatic cyclic diamine as cross-linking agent for the isocyanate (Imprafix HS-C), wherein said adhesives amounted to about 40 g/m$^2$. Next, a spherical active carbon on the basis of pitch having a diameter of about 0.5 to about 0.8 mm and an internal surface of about 1200 m$^2$ was applied and excessive active carbon was removed. The amount of fixed active carbon was about 220 grams/m$^2$. After this, the material was heated for about 2 minutes to a temperature of about 160° C. to achieve curing of the adhesive. At a pressure of about 10 mm water column the air-permeability decreases from about 1300 l/m$^2$ and minutes to about 1130 l/m$^2$ and minute. Then the back-side of the support layer was covered with polypropylene-microfibres, by means of the melt-blowing-process.

EXAMPLE 2

A polyester knitted fabric of about 80 g/m$^2$ being roughened on one side was coated on the smooth side with adsorber particles as explained above in example 1. On the rough side, micro-fibres were applied by means of the melt-blowing-process. The air-permeability at a pressure of about 10 mm water column was more than 2000 l/m$^2$min.

EXAMPLE 3

By use of the same material as in example 2, the adsorbing particles were applied at the roughened side followed by coating with micro-fibres using the melt-blowing-process. The air-permeability at a pressure of about 10 mm water column was again more than 2000 l/m$^2$min.

EXAMPLE 4

A support layer consisting of a filter paper of about 50 g/m$^2$ for air filters, comprising polyester fibres having an air-permeability of almost about 5000 l/m$^2$/min was coated with spherical active carbon, as described in example 1. Next, by use of a polyurethane hot-melt web of 14 g/m$^2$, two of these filter layers were laminated in such a way that the spherical active carbons were placed at the inner side and the paper formed the outer layers. Now, a micro-fibre layer was applied on one of the sides, as explained in example 1. The air-permeability of the combined filter layers was about 2000 l/m$^2$min. By using this method, the front paper layer was the support for the particle filter layer, comprising the micro-fibres and, for a layer of active carbon beads whereas the rear paper layer which carries active carbon beads simultaniously acts as a cover layer preventing eventually peeled-off active carbon beads from being blown into the stream of fresh air. The filter sheet material obtained in this manner is very suitable for being folded durably with a heated "knife". The sandwich-construction of the adsorption filter material provides a material having a very high rigidity.

EXAMPLE 5

Example 4 was repeated, however, a very open coarse-fibred and rigid polyester fleece was used instead of the filter paper. The filter material was exposed to an air stream of a linear velocity of about 0.55 m/sec and containing about 10 ppm toluene in air (about 50% relative humidity). After about 10 minutes, an effectivity of about 83% (break-through of about 1.7 ppm) was found.

EXAMPLE 6

A polypropylene lattice work having bars with a diameter of 0.3 mm, openings of 1.0 mm and a weight of 60 g/m² was completely coated by squeezing with the adhesive of example 1, the amount of the adhesive being 50 g/m². Then 480 parts (g/m²) of carbon particles were added to the lattice work and the adhesive was cured at 140° C. One side of the material was covered by micro-fibres produced by the melt-blown technique while the other side was covered by a very light polyester non-woven. Finally, a polyurethane hot melt of about 12 g/m² was used to laminate the non-woven.

It will be understood that the specification and the examples are illustrative but not restrictive to the present invention and that other embodiments within the spirit and scope of the invention will be obvious for those skilled in the art.

We claim:

1. A filter sheet material for the removal of unpleasant odours in the passenger cabins of motor vehicles, wherein the improvement resides in that on one and the same air-permeable support material a particle filter-layer as well as an adsorption filter layer containing adsorptive material are fixed.

2. A filter material according to claim 1, wherein said adsorption filter layer comprises adsorber particles and the adsorber particles in the adsorption filter layer are fixed at the support material by means of a discontinuously applied adhesive.

3. A material according to claim 1 or 2, wherein the adsorptive material in the adsorption filter layer are active carbon grains having a diameter of about 0.3 to about 2.0 mm.

4. A material according to claim 1 or 2, wherein the adsorber particles in the adsorption filter layer is a spherical active carbon on the basis of pitch or on the basis of a carbonized, porous polymer having a diameter of about 0.1 to about 1.0 mm.

5. A material according to claim 4 wherein the adsorber particles have a diameter of about 0.3 to about 0.8 mm.

6. A material according to claim 1 or 2, wherein the adsorbing material in the adsorption filter layer are porous polymers.

7. A material according to claim 6 wherein the porous polymers are based on styrene-divinylbenzene copolymers.

8. A material according to claim 1 or 2, wherein said adsorption filter layer comprises adsorber particles and the adsorber particles in the adsorption filter layer are hydrophobic molecular seives.

9. A material according to claim 2, wherein the adhesive is applied by a stencil in the form of a heap having a height of about 0.05 to about 0.5 mm and a diameter of about 0.1 to about 1 mm.

10. A material according to claim 2, wherein the adhesive consists of a thickened polymer dispersion.

11. A material according to claim 2, wherein the adhesive consists at least partially of a solvent-free or low solvent containing masked isocyanate pre-polymer which is cross-linked to form a polyurethane by means of a cross-linking agent for the isocyanate.

12. A material according to claim 2 wherein the adhesive is a mixture of a thickened polymer dispersion and a solvent-free or low solvent containing masked isocyanate pre-polymer which is cross-linked to form a polyurethane by means of a cross-linking agent for the isocyanate.

13. A material according to claim 2, wherein the adhesive consists of a hot melt.

14. A material according to claim 1, wherein the support material is a thermal shapable very air-permeable fleece.

15. A material according to claim 1, wherein the support material is a woven or knitted fabric.

16. A material according to claim 1, wherein the support material is a woven or knitted fabric which has been made more rigid by use of a thermoplastic resin.

17. A material according to claim 1, wherein the support material is a lattice work of a thermal shapable plastic.

18. A material according to claim 1, wherein the support material is a filter paper reinforced by plastic fibres, for use as an air filter.

19. A material according to claim 18 wherein the plastic fibres are polyester fibres.

20. A material according to claim 1, wherein the particle filter layer consists of a micro-fibres which are directly applied onto the support.

21. A material according to claim 20, wherein the micro-fibres are applied by means of the melt-blowing-process.

22. A material according to claim 20, wherein the micro-fibres comprise electret filter fibres or micro-glass fibres.

23. A material according to claim 22, wherein the electret filter fibres are made of plastic micro-fibres selected from the group consisting of polysulfone, fluorocarbons, polyvinylchloride, polycarbonate, polyester, polyethylene and polypropylene.

24. A material according to claim 23, wherein the plastic micro-fibres are polycarbonate- and/or polypropylene micro-fibres.

* * * * *

REEXAMINATION CERTIFICATE (3508th)

United States Patent [19]
von Blücher et al.

[11] B1 5,350,443
[45] Certificate Issued May 5, 1998

[54] FILTER SHEET MATERIAL FOR PASSENGER CABINS IN MOTOR VEHICLES

[76] Inventors: Hasso von Blücher, Parkstrasse 10, D-4006 Erkrath; Ernest de Ruiter, Höhenstrasse 57a, D-5090 Leverkusen 3, both of Germany

Reexamination Request:
No. 90/004,605, Apr. 10, 1997

Reexamination Certificate for:
Patent No.: 5,350,443
Issued: Sep. 27, 1994
Appl. No.: 47,473
Filed: Apr. 19, 1993

[51] Int. Cl.$^6$ .................. B01D 53/04; B01D 29/01
[52] U.S. Cl. ............... 96/135; 96/142; 96/154; 55/524; 55/527; 55/DIG. 39
[58] Field of Search ............... 55/524, 527, 528, 55/DIG. 5, DIG. 39; 96/134, 135, 142, 147, 153, 154

[56] References Cited

U.S. PATENT DOCUMENTS

| | | |
|---|---|---|
| 2,882,997 | 4/1959 | Smith et al. |
| 2,984,584 | 5/1961 | Glarum et al. ............... 96/153 X |
| 3,015,367 | 1/1962 | Smith et al. |
| 3,449,094 | 6/1969 | Baxt et al. ............... 96/153 X |
| 3,727,597 | 4/1973 | Hensler ............... 96/142 X |
| 3,978,185 | 8/1976 | Buntin et al. ............... 264/93 |
| 4,032,457 | 6/1977 | Matchett ............... 210/489 |
| 4,130,487 | 12/1978 | Hunter et al. ............... 96/154 X |
| 4,181,513 | 1/1980 | Fukuda et al. ............... 96/153 |
| 4,217,386 | 8/1980 | Arons et al. ............... 96/154 X |
| 4,234,326 | 11/1980 | Bailey et al. ............... 96/154 |
| 4,250,172 | 2/1981 | Mutzenberg et al. ............... 96/154 X |
| 4,289,513 | 9/1981 | Brownhill et al. ............... 96/135 |
| 4,342,811 | 8/1982 | Lopatin et al. ............... 96/153 X |
| 4,382,440 | 5/1983 | Kapp et al. ............... 96/134 X |
| 4,424,248 | 1/1984 | Tesch et al. ............... 96/154 X |
| 4,427,425 | 1/1984 | Briggs et al. ............... 96/134 X |
| 4,433,024 | 2/1984 | Eian ............... 96/153 X |
| 4,484,938 | 11/1984 | Okamoto et al. ............... 96/154 X |
| 4,510,193 | 4/1985 | Blücher et al. ............... 96/154 X |
| 4,517,308 | 5/1985 | Ehlenz et al. ............... 96/153 X |
| 4,610,705 | 9/1986 | Sarnosky et al. ............... 96/135 |
| 4,699,681 | 10/1987 | Kasmark, Jr. et al. ............... 96/154 X |
| 4,737,173 | 4/1988 | Kudirka et al. ............... 96/153 X |
| 4,868,032 | 9/1989 | Eian et al. ............... 428/198 |
| 4,917,942 | 4/1990 | Winters ............... 428/286 |
| 4,938,786 | 7/1990 | Tonomoto ............... 96/134 X |
| 4,957,897 | 9/1990 | Maroldo et al. ............... 502/432 |
| 4,981,501 | 1/1991 | Von Blücher et al. ............... 96/153 |
| 4,992,084 | 2/1991 | Von Blücher et al. ............... 96/153 X |
| 5,077,116 | 12/1991 | Lefkowitz ............... 428/141 |
| 5,139,546 | 8/1992 | Novobilski ............... 96/142 |
| 5,141,706 | 8/1992 | Clark ............... 96/142 X |
| 5,192,346 | 3/1993 | Kowalczyk ............... 96/135 |
| 5,221,292 | 6/1993 | Aoyama ............... 96/142 X |
| 5,221,573 | 6/1993 | Baigas, Jr. ............... 55/DIG. 39 |

FOREIGN PATENT DOCUMENTS

| | | |
|---|---|---|
| 0100907 | 7/1983 | European Pat. Off. |
| 2503615 | 7/1975 | Germany. |
| 3228156 | 2/1984 | Germany. |
| 3304349 | 8/1984 | Germany. |
| 3740091 | 6/1989 | Germany. |
| 3904623 | 8/1990 | Germany. |
| 4134222 | 4/1993 | Germany. |
| 118816 | 5/1991 | Japan. |

*Primary Examiner*—Robert H. Spitzer

[57] ABSTRACT

Disclosed is a filter sheet material for passenger cabins in motor vehicles, especially for the removal of unpleasant exhaust fumes, whereby on one and the same air permeable support material, a particle-filtering layer as well as an adsorption filter layer is provided. The adsorptive material in the adsorption filter layer is selected from active carbon particles, activated carbonized carbon particles, molecular sieves, porous polymer adsorbers and carbonized ion-exchangers. The particle filtering layer comprises a microfibre agglomeration.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–24 are cancelled.

* * * * *

REEXAMINATION CERTIFICATE (3832nd)

United States Patent [19]
von Blücher et al.

[11] B1 5,350,443
[45] Certificate Issued Aug. 10, 1999

[54] FILTER SHEET MATERIAL FOR PASSENGER CABINS IN MOTOR VEHICLES

[76] Inventors: Hasso von Blücher, Parkstrasse 10, D-4006 Erkrath; Ernest de Ruiter, Höhenstrasse 57a, D-5090 Leverkusen 3, both of Germany

Reexamination Request:
No. 90/004,605, Apr. 10, 1997

Reexamination Certificate for:
Patent No.: 5,350,443
Issued: Sep. 27, 1994
Appl. No.: 08/047,473
Filed: Apr. 19, 1993

[51] Int. Cl.$^6$ ............... B01D 53/04; B01D 29/01
[52] U.S. Cl. ............... 96/135; 96/142; 96/154; 55/524; 55/527; 55/DIG. 39
[58] Field of Search ............... 55/524, 527, 528, 55/DIG. 5, DIG. 39; 96/134, 135, 142, 147, 153, 154

[56] References Cited

U.S. PATENT DOCUMENTS

| | | |
|---|---|---|
| 2,882,997 | 4/1959 | Smith et al. |
| 3,015,367 | 1/1962 | Smith et al. |
| 4,032,457 | 6/1977 | Matchett ............... 210/489 |
| 4,868,032 | 9/1989 | Eian et al. ............... 428/198 |
| 4,917,942 | 4/1990 | Winters ............... 428/286 |
| 5,077,116 | 12/1991 | Lefkowitz ............... 428/141 |

FOREIGN PATENT DOCUMENTS

| | | |
|---|---|---|
| 4134222 | 4/1993 | Germany. |
| 118816 | 5/1991 | Japan. |

*Primary Examiner*—Robert H. Spitzer

[57] ABSTRACT

Disclosed is a filter sheet material for passenger cabins in motor vehicles, especially for the removal of unpleasant exhaust fumes, whereby on one and the same air permeable support material, a particle-filtering layer as well as an adsorption filter layer is provided. The adsorptive material in the adsorption filter layer is selected from active carbon particles, activated carbonized carbon particles, molecular sieves, porous polymer adsorbers and carbonized ion-exchangers. The particle filtering layer comprises a microfibre agglomeration.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 9 and 20 are cancelled.

Claims 1, 3, 4, 6, 8, 10–13, 21 and 22 are determined to be patentable as amended.

Claims 5, 7, 14–19, 23 and 24, dependent on an amended claim, are determined to be patentable.

1. A filter sheet material for the removal of unpleasant odours in passenger cabins of motor vehicles, wherein the improvement resides in that on one and the same air-permeable support material *are fixed* a particle filter layer *comprising blown micro-fibres fixed on a side of the support material; and*

[as well as] an adsorption filter layer [containing adsorptive material are fixed],
   *wherein* said adsorption filter layer [comprising] *comprises* adsorber particles [in the form of grains and said adsorber particles in the adsorption filter layer being] fixed [at] *to* the support material by means of a discontinuously applied adhesive *that is applied by a stencil in the form of heaps having a height of about 0.05 to about 0.5 mm and a diameter of about 0.1 to about 1 mm.*

3. A material according to claim 1 [or 2], wherein the adsorptive material in the adsorption filter layer are active carbon grains having a diameter of about 0.3 to about 2.0 mm.

4. A material according to claim 1 [or 2], wherein the adsorber particles in the adsorption filter layer is a spherical active carbon on the basis of pitch or on the basis of a carbonized, porous polymer having diameter of about 0.1 to about 1.0 mm.

6. A material according to claim 1 [or 2], wherein the adsorbing material in the adsorption filter layer are porous polymers.

8. A material according to claim 1 [or 2], wherein the adsorption filter layer comprises adsorber particles and the adsorber particles in the adsorption filter layer are hydrophobic molecular sieves.

10. A material according to claim [2] *1*, wherein the adhesive consists of a thickened polymer dispersion.

11. A material according to claim [2] *1*, wherein the adhesive consists at least partially of a solvent-free or low solvent containing masked isocyanate pre-polymer which is cross-linked to form a polyurethane by means of a cross-linking agent for the isocyanate.

12. A material according to claim [2] *1*, wherein the adhesive is a mixture of a thickened polymer dispersion and a solvent-free or low solvent containing masked isocyanate prepolymer which is cross-linked to form a polyurethane by means of a cross-linking agent for the isocyanate.

13. A material according to claim [2] *1*, wherein the adhesive consists of a hot melt.

21. A material according to claim [20] *1*, wherein the micro-fibres are applied by means of [the] *a* melt-blowing process.

22. A material according to claim [20] *1*, wherein the micro-fibres comprise electret fibres or micro-glass fibres.

* * * * *